3,188,327
17β-(LOWER CYCLOALK-1'-ENYLOXY) AND 17β-(1'-LOWER ALKOXY-LOWER CYCLOALKOXY) DERIVATIVES OF 2-CYANO-Δ²-ANDROSTEN-17β-OL
Albert Bowers and Pierre Crabbé, Mexico City, Mexico, assignors to Syntex Corporation, Panama, Panama, a corporation of Panama
No Drawing. Filed June 17, 1963, Ser. No. 288,443
9 Claims. (Cl. 260—397.5)

This invention relates to novel cyclopentanopolyhydrophenanthrene derivatives and to processes for their preparation.

More particularly, this invention relates to novel 17β-(lower cycloalk-1'-enyloxy) and 17β-(1'-lower alkoxy-lower cycloalkoxy) derivatives of 2α-lower alkyl dihydrotestosterones, e.g., 2α-methyldihydrotestosterone, and 2-cyano-Δ²-androsten-17β-ol represented by the general formulas:

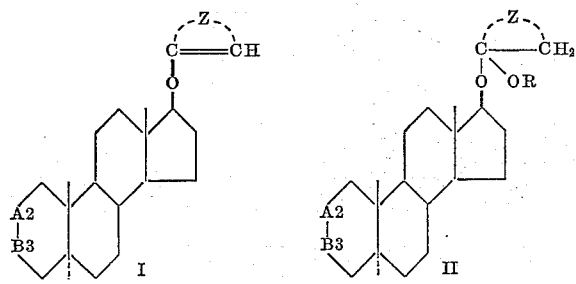

In these formulas, the grouping

represents either the grouping

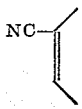

or the grouping

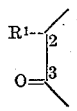

wherein $R^1$ represents a lower alkyl group, e.g., methyl, ethyl, propyl and the like; at the 2,3-position of the steroid nucleus, the carbon and hydrogen atoms normally present at these positions being omitted in the above illustrations for the sake of clarity; R represents a lower alkyl group, and Z represents a divalent hydrocarbon chain of up to 6 carbon atoms, e.g., propylene, i.e.,

butylene, pentylene, and the like.

The compounds represented by formulas I and II hereinabove are anabolic-androgenic agents having a favorable anabolic-androgenic ratio. They also have antiestrogenic, anti-gonadotropic, anti-fibrillatory and appetite-stimulating properties, and in addition lower blood cholesterol levels, relieve premenstrual tension and suppress the output of the pituitary gland.

The novel compounds of the present invention can be prepared by the process depicted by the following reaction scheme:

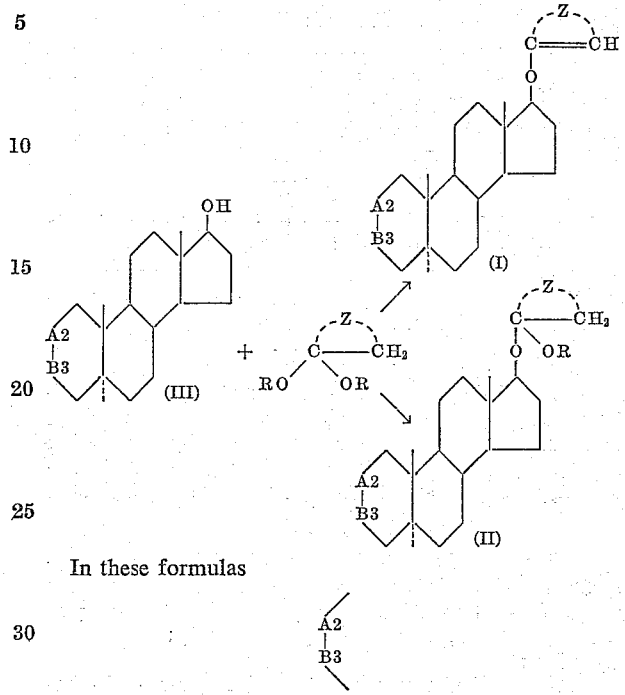

In these formulas

R and Z have the same meanings as set forth hereinabove.

In practicing the process depicted above, the starting material (III), either a 2α-lower alkyl dihydrotestosterone, e.g., 2α-methyldihydrotestosterone, or 2-cyano-Δ²-androsten-17β-ol, is reacted with a di(lower alkyl)ketal of a lower cycloalkanone, wherein the lower cycloalkanone moiety contains up to 8 carbon atoms, such as the dimethyl ketal of cyclopentanone, the diethyl ketal of cyclopentanone, the diethyl ketal of cyclohexanone, the dipropyl ketal of cyclohexanone, the diethyl ketal of cycloheptanone, and the like, to give the corresponding 17β-(lower cycloalk-1'-enyloxy) derivative (I) and/or the corresponding 17β-(1'-lower alkoxy-lower cycloalkoxy) derivative (II).

This reaction can be effected either in the presence of an inert organic solvent, e.g., an aromatic hydrocarbon such as benzene, toluene, xylene, and the like, or a halogenated aliphatic hydrocarbon such as methylene chloride, chloroform, and the like, or in the absence of any solvent. Similarly, an acid catalyst, e.g., a hydrocarbon sulfonic acid such as p-toluenesulfonic acid and the like, can be employed if desired but is not essential.

The reaction will usually be carried out at reflux temperature for periods of time ranging from about 15 minutes to about 12 hours, with the longer of these reaction times, especially in the presence of a solvent and an acid catalyst, generally favoring the formation of the 17β-(lower cycloalk-1'-enyloxy) derivatives. However, longer or shorter reaction times coupled with lower or higher reaction temperatures can be employed, if desired, and thus the choice of any particular set of operating conditions is not critical, and will be determined in large measure by the types and amounts of products desired.

The following working examples serve to illustrate, but are not intended to limit the scope of the present invention:

*Example 1*

A mixture of 1 g. of 2α-methyl-dihydro-testosterone, 400 cc. of chloroform and 20 mg. of p-toluenesulfonic acid, was heated till 20 cc. of chloroform distilled off, in order to remove moisture. Then there were added 5 cc. of the diethyl ketal of cyclopentanone and the distillation was continued for 0.5 hour. Pyridine was added, the solvents evaporated and the residue crystallized from acetone-hexane, thus furnishing 17β-(1'-ethoxy cyclopentyloxy)-2-α-methyl-androstan-3-one (Compound No. 1).

*Example II*

2α-methyl-dihydrotestosterone was treated following the procedure described in Example I, except that the dimethyl ketal of cyclopentanone was used instead of the diethylketal, thus giving 17β-(1'-methoxycylopentyloxy)-2α-methylandrostan-3-one (Cpd. No. 2).

*Example III*

2α-methyl-dihydrotestosterone was treated according to Example I, except that the diethylketal of cyclopentanone was substituted by the diethylketal of cyclohexanone, thus yielding 17β-(1'-ethoxy cyclohexyloxy)-2α-methyl-androstan-3-one (Cpd. No. 3).

*Example IV*

2α-methyl dihydro testosterone was treated in accordance with Example I, with the exception that the diethyl ketal of cyclopentanone was substituted by the diethyl ketal of cycloheptanone, thus furnishing 17β-(1'-ethoxycycloheptyloxy)-2α-methyl-androstan-3-one (Cpd. No. 4).

*Example V*

2-cyano-Δ²-androsten-17β-ol (obtained from the corresponding 2-formyl compound by conventional procedures via the oxime thereof) was treated according to Examples I, II, III and IV, thus affording respectively:
Cpd. No.:
    5. 17β-(1'-ethoxycyclopentyloxy)-2-cyano - Δ² - androstene,
    6. 17β-(1'-methoxycyclopentyloxy)-2-cyano-Δ² - androstene,
    7. 17β-(1'-ethoxycyclohexyloxy)-2-cyano-Δ² - androstene,
    8. 17β-(1'-ethoxycycloheptyloxy)-2-cyano - Δ² - androstene,

*Example VI*

A mixture of 1 g. of 2α-methyl dihydro testosterone, 200 cc. of benzene and 20 mg. of p-toluenesulfonic acid was heated till 30 cc. of benzene distilled off. Thereafter 5 cc. of the diethylketal of cyclopentanone were added and the resulting solution was refluxed for 8 hours. Pyridine was added, the solvents removed and the residue crystallized from acetone-hexane, thus yielding 17β-(cyclopent-1'-enyloxy)-2α-methyl-androstan-3-one (Cpd. No. 9).

*Example VII*

2α-methyl dihydrotestosterone was treated according to Example VI, except that the diethylketal of cyclopentanone was substituted by the diethylketal of cyclohexanone and by the diethyl-ketal of cycloheptanone, thus furnishing respectively 17β-(cyclohex-1'-enyloxy) - 2α-methyl-androstan-3-one (Cpd. No. 10) and 17β-(cyclohept-1'-enyloxy)-2α-methyl-androstan-3 - one (Cpd. No. 11).

*Example VIII*

2-cyano-Δ²-androsten-17β-ol was treated in accordance with Examples VI and VII, thus yielding respectively:
Cpd. No.:
    12. 17β-cyclopent-1'-enyloxy)-2-cyano - Δ² - androstene,
    13. 17β-(cyclohex-1'-enyloxy)-2-cyano - Δ² - androstene
    14. 17β-(cyclohept-1'-enyloxy)-2-cyano - Δ² - androstene.

*Example IX*

A mixture of 1 g. of 2α-methyl-dihydrotestosterone and 5 cc. of the diethylketal of cyclopentanone was refluxed for 5 hours, and then evaporated to dryness. The residue was chromatographed on alumina, thus affording 17β-(1'-ethoxycyclopentyloxy)-2α-methyl-androstan-3 - one (Cpd. No. 1) and 17β-(cyclopent-1'-enyloxy)-2-α-methyl-androstan-3-one (Cpd. No. 9).

We claim:
1. A compound represented by the formula:

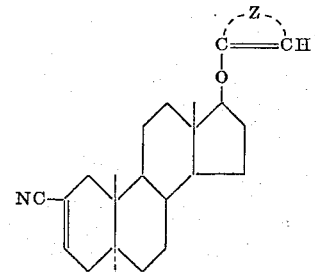

2. 17β-cyclopent-1'-enyloxy)-2-cyano-Δ²-androstene.
3. 17β-(cyclohex-1'-enyloxy)-2-cyano-Δ²-androstene.
4. 17β-(cyclohept-1'-enyloxy)-2-cyano-Δ²-androstene.
wherein Z is a divalent hydrocarbon chain of up to 6 carbon atoms.

5. A compound represented by the formula:

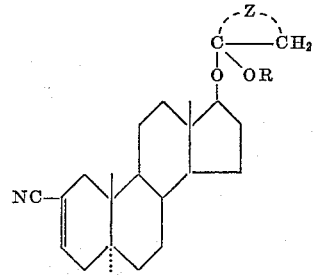

wherein R is a lower alkyl group and Z is a divalent hydrocarbon chain of up to 6 carbon atoms.

6. 17β-(1'-methoxycyclopentyloxy)-2-cyano-Δ² - androstene.
7. 17β-(1'-ethoxycyclopentyloxy)-2-cyano-Δ² - androstene.
8. 17β-(1'-ethoxycyclohexyloxy)-2-cyano - Δ² - androstene.
9. 17β-(1'-ethoxycycloheptyloxy)-2-cyano-Δ² - androstene.

References Cited by the Examiner

Ercoli et al., Chem. and Ind., p. 1284–85, July 1962.
Fieser et al., Steroids (1959), p. 692–96, Reinhold Pub. Co., N.Y.

LEWIS GOTTS, *Primary Examiner.*

UNITED STATES PATENT OFFICE
CERTIFICATE OF CORRECTION

Patent No. 3,188,327                            June 8, 1965

Albert Bowers et al.

It is hereby certified that error appears in the above numbered patent requiring correction and that the said Letters Patent should read as corrected below.

Column 4, after the formula in claim 1, insert the following:

> wherein Z is a divalent hydrocarbon chain of up to 6 carbon atoms.

Signed and sealed this 19th day of October 1965.

(SEAL)
Attest:

ERNEST W. SWIDER
Attesting Officer

EDWARD J. BRENNER
Commissioner of Patents